Sept. 30, 1941.　　　　J. JOHNSTON　　　　2,257,563
NONTILTING FIFTH WHEEL
Filed Sept. 24, 1940　　　3 Sheets-Sheet 2
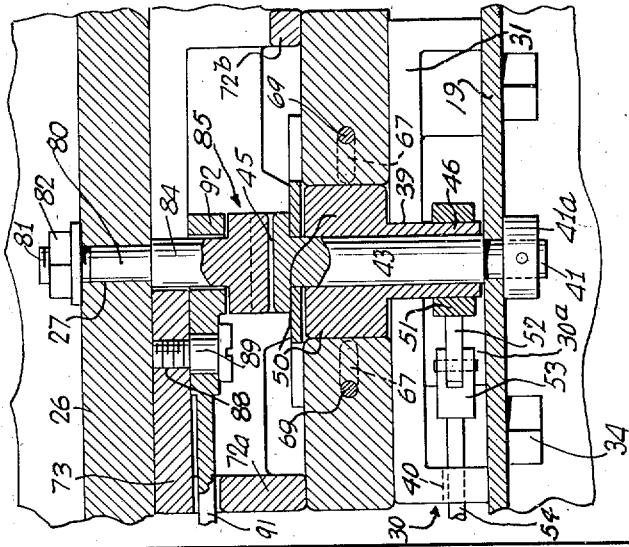
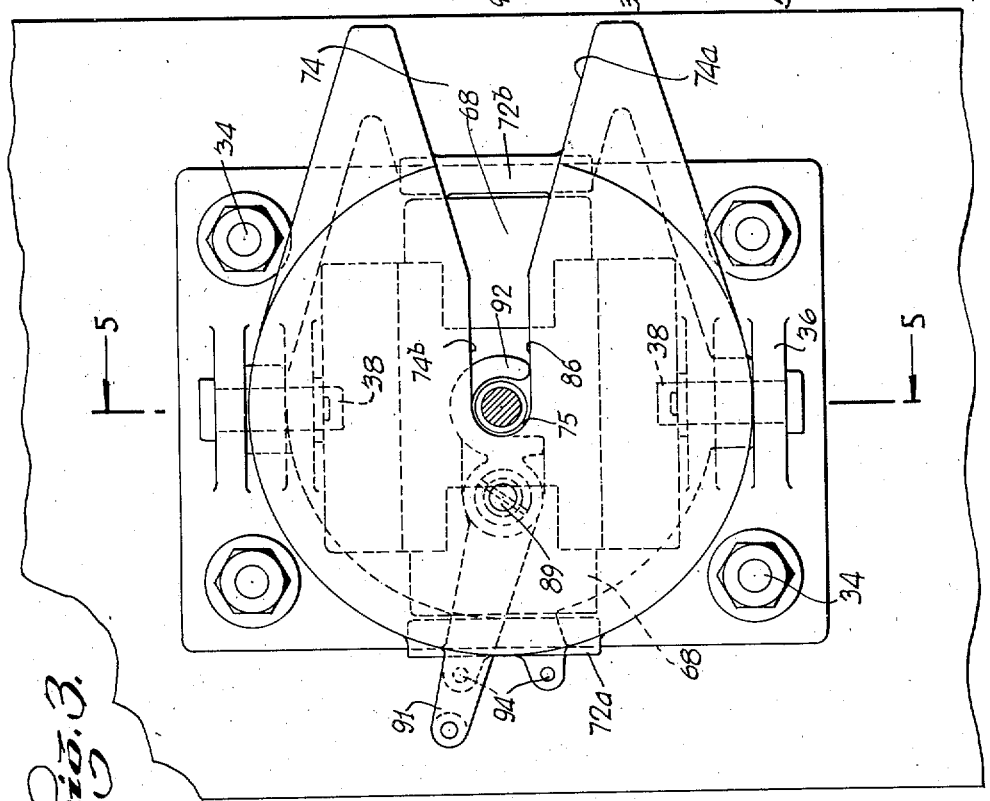
INVENTOR
JOHN JOHNSTON
BY
Carl Miller
ATTORNEY Sept. 30, 1941.  J. JOHNSTON  2,257,563
NONTILTING FIFTH WHEEL
Filed Sept. 24, 1940  3 Sheets-Sheet 3
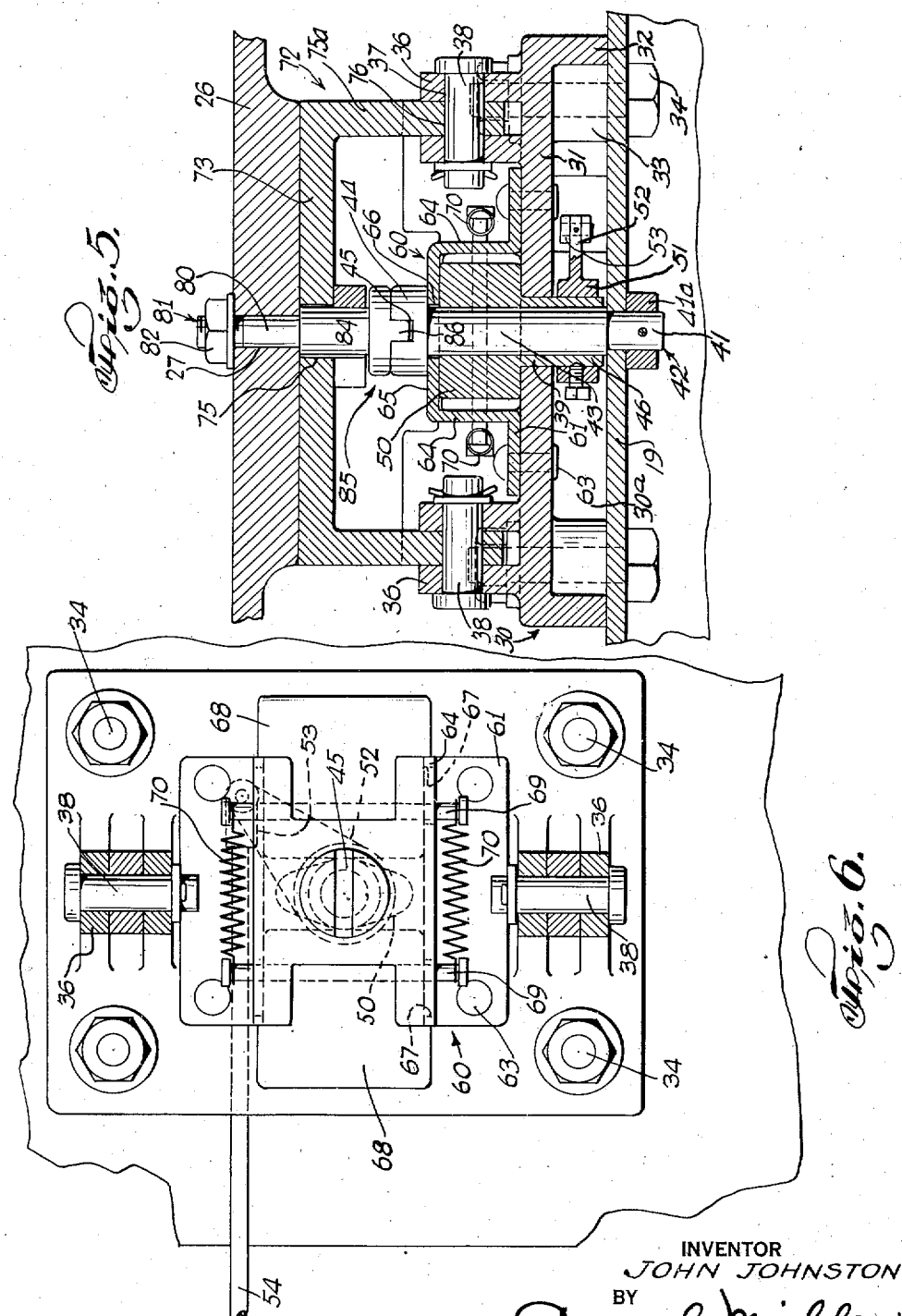
INVENTOR
JOHN JOHNSTON
BY
Carl Miller
ATTORNEY Patented Sept. 30, 1941

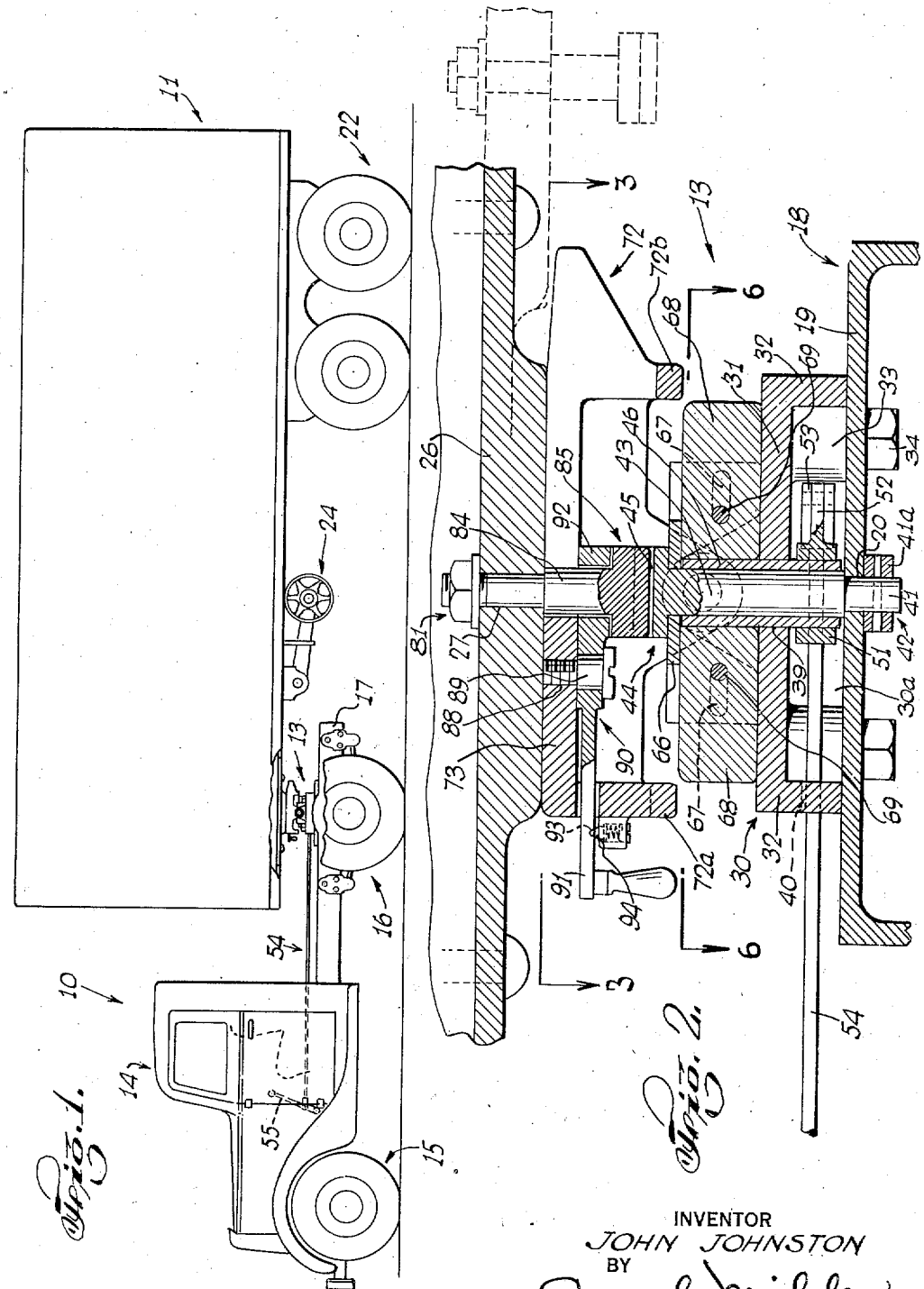

2,257,563

UNITED STATES PATENT OFFICE 2,257,563

NONTILTING FIFTH WHEEL

John Johnston, Jersey City, N. J.

Application September 24, 1940, Serial No. 358,143

10 Claims. (Cl. 280—33.1)

This invention relates to non-tilting trailers.

An object of this invention is to provide a connection between a trailer and a truck, with means to prevent the trailer from tilting sidewise when the truck makes a turn.

A further object of this invention is to provide a connection between a trailer and a truck having highly improved means for easily connecting the trailer to the truck, means being further provided under the control of the operator sitting within the cab of the truck to prevent tilting of the trailer when the truck turns relative to the trailer.

Still a further object of this invention is to provide a strong, rugged and durable pivotal connection between a trailer and a truck, which shall be relatively inexpensive to manufacture, easy to manipulate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a truck and trailer provided with a connection embodying the invention;

Fig. 2 is an elevational cross-sectional view of the connection between the truck and trailer;

Fig. 3 is a cross-sectional view taken on line 3—3 of Fig. 2;

Fig. 4 is a partial view similar to Fig. 2, but showing the cam turned to prevent tilting of the trailer;

Fig. 5 is a cross-sectional view taken on line 5—5 of Fig. 3; and

Fig. 6 is a cross-sectional view taken on line 6—6 of Fig. 2.

Referring now in detail to the drawings, 10 designates a motor truck, and 11 a trailer connected thereto by a pivotal connection 13 embodying the invention. The truck 10 may be of any usual construction, and comprises a cab 14, front wheels 15, rear wheels 16, and a frame 17, supported by the wheels and extending rearwardly of the cab 14.

The frame 17 includes a central channel shaped member 18 having a top wall 19 formed with a vertical bore or opening 20.

The trailer 11 has rear wheels 22 and a retractable wheel support 24, adjacent its forward end to support the trailer when the latter is not connected to the truck.

Fixed to the underside of the trailer 11, adjacent the forward end thereof, is a plate 26 formed with a vertical through opening 27, aligned with the opening 20 in the frame channel 18.

The connecting mechanism 13, between the truck 10 and the trailer 11, comprises a member 30 having a top wall 31, parallel and spaced above the wall 19, and downwardly extending side walls 32 contacting the upper surface of said wall 19. At the corners of the wall 31 are apertured bosses 33, through which there extend bolts 34, which fasten member 30 to the frame 18. At the sides of member 30 are upstanding aligned pairs of apertured ears 36 formed with bearing openings 37, supporting aligned pivot pins 38 traversing the spaces between the apertured ears.

Wall 31 is formed with a central vertical opening 39 aligned with the openings 20 and 27. The wall 32 of member 30, which is closer to the cab 14, is formed with a through slot 40, for the purpose hereinafter appearing.

Journalled in the opening 20, is the lower end 41 of a king pin 42. Fixed to the lower end 41, is a collar 41a contacting the underside of wall 19. Said king pin 42 has an enlarged shank 43 of larger diameter than the lower end 41 of said king pin, extending upwardly from said lower end through the opening 39. The lower end of shank 43 rests on wall 19. At the upper end of shank 43 is a head 44 formed with a transverse groove 45, running longitudinally of the truck 10.

Rotatably mounted on shank 43 is a sleeve 46 journalled within the opening 39 and extending down into the chamber 30a formed by member 30 and wall 19. On the upper end of sleeve 46 is a cam 50 of substantially elliptical shape, normally disposed at right angles to the longitudinal axis of the truck 10. Received on the lower end of sleeve 46, and disposed within chamber 30a, is a ring 51 from which there extends an arm 52. Pivoted to the outer end of arm 52, as at 53, is a connecting rod 54 passing through the slot 40, and extending longitudinally of the truck 10 into the cab 14. The rod 54 may be pulled forwardly by means of a hand lever 55 disposed within the cab and adapted to be actuated by the operator from within the cab.

Mounted on member 30, and fixed thereto, is a block guide member 60 having horizontal, aligned walls 61 contacting the upper surface of wall 31, and riveted thereto by corner rivets 63. Extending upwardly from the walls 61 are parallel walls 64 disposed on opposite sides of the cam 50. The vertical walls 64 are interconnected by a top horizontal wall 65 formed with a central opening 66, through which the shank 43 passes. The side walls 64 are each formed with a pair of horizontally aligned slots 67.

Slidably mounted within the guide member 60 are a pair of similar, symmetrically disposed blocks 68, disposed on opposite sides of the cam 50. Extending through the blocks 68 are transverse pins 69 projecting through the slots 67 and extending therebeyond. The pins 69 are interconnected by coil tension springs 70 which tend to pull the blocks 68 inwardly against opposite sides of the cam 50.

It will now be understood that upon pulling the connecting rod 54 forwardly, cam 50 will be rotated to separate the blocks 68, for the purpose hereinafter appearing.

Pivotally mounted on the pins 38 is a member 72 having a top wall 73. The top wall 73 is formed with a longitudinal cut-away portion 74, said cut-away portion tapering at its rear end, as at 74a, and including a slot 74b of uniform width extending from the tapering portion of the cut-out, and terminating in a semi-circular end 75, concentric with the opening 27.

Extending downwardly from top wall 73 are parallel ears 75a received between the pairs of ears 36, and formed with bearing openings 76 within which the pivot pins 38 are journalled.

It will now be understood that member 72 will rock about the axis of the pins 38. At the forward and rear ends of member 72 are parallel flanges 72a and 72b, disposed at right angles to the ears 75a. The lower edges of said flanges are disposed somewhat above the level of the top surfaces of blocks 68, for the purpose hereinafter appearing.

Extending through the opening 27 is the upper end 80 of a king pin 81. Screwed to the upper end 80, is a nut 82 to fix said pin to the trailer. Extending downwardly from the end portion 80 of the king pin is a shank 84 passing through the opening or cut-out 74, and contacting the semi-circular end portion 75 of said cut-out. At the lower end of the shank 84 is a head 85 formed with a longitudinal rib 86 slidably received in the groove 45 of head 44.

The top wall 73 is formed with a vertical screw threaded opening 88, and screwed within said screw threaded opening, is a headed stud 89. Pivoted on said stud 89 is a lever 90 having a handle 91 at one end and a hook 92 at its other end. Upon rotating the handle, hook 92 will engage the shank 84 when said shank is at the semi-circular end of the cut-out 74. Handle 91 may be formed with a socket 93 at its underside to receive a spring pressed detent on member 72 to keep the handle in position when the hook 92 engages the shank 84.

It will now be understood that hook 92 is located between the head 85 at the lower end of the shank and wall 73 of member 72.

It will now be understood that the trailer is connected to the truck by a mechanism 13 and may pivot about the axes of king pins 81 and 42.

When the wheel structure 24 is lowered, handle 91 may be rotated to disconnect the hook 92 from shank 84. The truck may then be moved forwardly to disconnect the truck from the trailer, the king pin 81 moving rearwardly through the cut-out 74 to again connect the truck to the trailer. The truck is backed up to permit the king pin 81 to move forwardly through the cut-out 74, until the shank 84 is within the semi-circular opening 75. Lever 90 is then rotated to engage the king pin 81.

If, in backing up to unload, the trailer is rotated at an angle to the truck, a forward pull on the connecting rod through the lever 55 will separate the blocks 68, to move said blocks beneath the front and rear flanges 72a and 72b of member 72 to prevent tilting of the trailer.

When the lever 55 is again moved rearwardly to rotate the cam to normal position, the springs 70 will draw the blocks 68 inwardly to clear the flanges 72a and 72b.

It will now be understood that if desired the separation of the blocks may be effected automatically when the trailer turns relative to the truck, as for example, when the truck turns a corner. To produce the automatic separation of the blocks, it is merely necessary to loosen the ring 51 from the sleeve 46 and to fasten said sleeve to the pin 43. When the ring 51 is loosened from the pin, the separation of the blocks is no longer effected from the cab by pulling the rod 54. However, as the trailer 26 rotates, the pin 80 will rotate therewith, and by reason of the tongue and groove connection of the pin 80 with the pin 43, the latter pin will also rotate to turn the sleeve 46 and hence cam 50 for separating the blocks. The purpose of the tongue 86 and groove 45 will now be clearly understood.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new, and desire to secure by Letters Patent:

1. In combination with a truck, a vertical pin journalled on said truck, a member pivoted to said truck about a horizontal axis, a trailer on said member, a vertical pin on said trailer and journalled in said member, said pins having groove and slot connecting means, and a lever pivoted to said member having a hook at one end to engage the pin on the trailer, a pair of blocks, means on the first pin to separate said blocks, and means on said member to engage said blocks when said blocks are separated, to prevent tilting of the trailer about a longitudinal axis.

2. In combination with a truck, a vertical pin journalled on said truck, a member pivoted to said truck about a horizontal axis, a trailer supported by said member, a vertical pin on said trailer and journalled in said member, a lever pivoted to said member having a hook at one end to engage the pin on the trailer, a pair of blocks slidably mounted on said truck, and cam means between said blocks to separate said blocks to move the same beneath portions of said member, when the trailer is at an angle to said truck.

3. In combination, a truck having a frame formed with an opening, a king pin journalled within said opening and extending upwardly from said frame, a trailer having an opening, a king pin within said last mentioned opening and fixed to said trailer, a member pivoted to said truck about a horizontal axis and having a top wall formed with a longitudinal cut-out to receive the king pin on the trailer, a lever pivoted to said member and having a hook engaging the king pin on the trailer, a cam rotatably mounted on the king pin on the truck, a pair of blocks on opposite sides of said cam, means to guide said blocks, and means to rotate said cam to separate said blocks, said first member having portions adapted to be supported by the blocks, when the blocks are separated by said cam.

4. In combination with the frame of a truck having a vertical opening, a king pin journalled within said opening and extending upwardly therefrom, a sleeve rotatably mounted on said king pin and formed with a cam at its upper end, a member fixed to the upper side of said frame, and having a through opening through which said sleeve passes, a ring fixed to the lower end of said sleeve and formed with a radial arm, a connecting rod pivoted to one end of said arm, a guide block fixed to the upper side of said member, a pair of blocks slidably mounted within said block guide, and mounted on said member, and disposed on opposite sides of said cam, and springs interconnecting said blocks, said cam being adapted to move said blocks in opposite directions, upon pulling said connecting rod to rotate said cam.

5. In combination with the frame of a truck having a vertical opening, a king pin journalled within said opening and extending upwardly therefrom, a sleeve rotatably mounted on said king pin and formed with a cam at its upper end, a member fixed to the upper side of said frame and having a through opening through which said sleeve passes, a ring fixed to the lower end of said sleeve and formed with a radial arm, a connecting rod pivoted to one end of said arm, a guide block fixed to the upper side of said member, a pair of blocks slidably mounted within said block guide, and mounted on said member, and disposed on opposite sides of said cam, and springs interconnecting said blocks, said cam being adapted to move said blocks in opposite directions, upon pulling said connecting rod to rotate said cam, said first member being 1 med with apertured ears, a trailer supporting member pivoted to said ears about a horizontal axis, said trailer supporting member having a top wall adapted to engage the underside of a trailer, said trailer supporting member having downwardly extending flanges adapted to be engaged by the underside of said blocks, when said blocks are separated by the cam to prevent the trailer from tilting.

6. In combination with a truck comprising a frame, a king pin journalled on said frame and extending upwardly therefrom, a cam on said pin, a block guide mounted on said frame, a pair of blocks slidably mounted within said block guide, on opposite sides of said cam, and adapted to be separated upon turning said cam, springs interconnecting said blocks to retain said blocks in contact with said cam, a trailer, a king pin journalled within said trailer, a trailer supporting member pivoted to said frame about a horizontal axis, and being formed with a top wall having a longitudinal cut-out to receive the king pin on the trailer, a lever pivoted to said trailer supporting member and having a hook adapted to engage the king pin on the trailer, and said trailer supporting member being formed with a pair of walls adapted to be engaged by the upper surfaces of said blocks, when said blocks are separated by the cam, to prevent the trailer from tilting.

7. In combination with a truck comprising a frame, a king pin journalled on said frame and extending upwardly therefrom, a cam on said pin, a block guide mounted on said frame, a pair of blocks slidably mounted within said block guide, on opposite sides of said cam, and adapted to be separated upon turning said sleeve, springs interconnecting said blocks to retain said blocks in contact with said cam, a trailer, a king pin journalled within said trailer, a trailer supporting member pivoted to said frame about a horizontal axis, and being formed with a top wall having a longitudinal cut-out to receive the king pin on the trailer, a lever pivoted to said trailer supporting member and having a hook adapted to engage the king pin of the trailer, and said trailer supporting member being formed with a pair of walls adapted to be engaged by the upper surfaces of said blocks, when said blocks are separated by the cam, to prevent the trailer from tilting longitudinally of its axis, a handle on said lever, and means to retain the lever against rotation.

8. In combination with a truck, a trailer, a member fixed to the truck, a second member pivoted to the first member about a horizontal axis and supporting the trailer, means on the first member normally out of engagement with respect to the second member, and means to move said first means into engagement with the second member, automatically upon moving the trailer to an angle relative to the truck, to prevent tilting of the trailer about its longitudinal axis.

9. In combination with a truck and a trailer, a member fixed to the truck, a vertical king pin journalled on said member, cam means on said king pin, a member pivoted to said first member about a horizontal axis, and supporting said trailer, a king pin journalled on said second member, and fixed to the trailer, and having a non-rotary connection with respect to the first king pin, whereby rotation of the trailer relative to the truck will cause rotation of the first king pin, a pair of blocks normally out of engagement with respect to the second member, and means to separate said blocks to move said blocks beneath portions of said second member, automatically upon rotating said trailer relative to said truck, to prevent tilting of said second member relative to the first member, and hence, to prevent tilting of the trailer about its longitudinal axis.

10. In combination with a truck, a member fixed thereto, a king pin journalled on said member, a cam on said king pin, a member pivoted to the first member about a horizontal axis, and supporting said trailer, a king pin journalled on said second member, and fixed to said trailer, and having a tongue and groove connection with the first king pin, a pair of blocks on opposite sides of the cam, and adapted to be separated by said cam, and means on said second member adapted to be engaged by said blocks, upon separating said blocks, to prevent tilting of said second member.

JOHN JOHNSTON.